United States Patent [19]

Patterson

[11] Patent Number: 4,913,819
[45] Date of Patent: Apr. 3, 1990

[54] LIQUID JET SOLIDS REMOVAL SYSTEM FOR PROCESS VESSELS

[75] Inventor: John C. Patterson, Plano, Tex.

[73] Assignee: Atlantic Richfield Company, Los Angeles, Calif.

[21] Appl. No.: 90,814

[22] Filed: Aug. 28, 1987

[51] Int. Cl.[4] ............................................. B01D 12/00
[52] U.S. Cl. ................................... 210/523; 210/513; 239/523; 134/171; 134/182; 134/166 R
[58] Field of Search ............. 210/207, 208, 209, 220, 210/456, 519, 520, 523, 513, 803; 239/143, 523, 529; 134/22.18, 171, 182, 166 R, 169 R

[56] References Cited

U.S. PATENT DOCUMENTS

| | | | |
|---|---|---|---|
| 2,452,991 | 11/1948 | Butcher | 210/207 |
| 2,742,158 | 4/1956 | Schuller | 210/456 |
| 3,068,172 | 12/1962 | Leviel et al. | 210/715 |
| 3,741,235 | 6/1973 | Ambrose et al. | 134/166 R |
| 3,788,981 | 1/1974 | Richard et al. | 210/519 |
| 3,965,013 | 6/1976 | Jackson | 210/519 |
| 4,024,881 | 5/1977 | Weiland et al. | 134/167 R |
| 4,426,233 | 1/1984 | Manabe et al. | 210/258 |
| 4,427,553 | 1/1984 | Fore | 134/22.18 |
| 4,642,138 | 2/1987 | Koyase et al. | 210/803 |
| 4,722,785 | 2/1988 | Reid | 210/220 |

FOREIGN PATENT DOCUMENTS 1361557 7/1974 United Kingdom .

Primary Examiner—Richard V. Fisher
Assistant Examiner—Cynthia L. Nessler

[57] ABSTRACT

A liquid jet manifold arrangement for process separator vessels for removing solids such as sand and sediment which accumulate along the bottom wall of the vessel during operation. A plurality of elongated manifolds are arranged to extend longitudinally along the vessel bottom wall and each manifold is provided with an array of jet nozzles which are arranged along the manifold bottom side and top side, respectively. The nozzles extend in a direction such as to create a substantially vortical flow of liquid to entrain and urge the fluidized solids mixture toward the solid removal outlet opening in the vessel. The manifolds are supported in a standoff position from the vessel bottom wall by adjustable support brackets and a generally arcuate shield is supported above and spaced from each of the jet manifolds to redirect the liquid flow out of the nozzles to enhance the vortical flow pattern.

8 Claims, 2 Drawing Sheets

LIQUID JET SOLIDS REMOVAL SYSTEM FOR PROCESS VESSELS

BACKGROUND OF THE INVENTION

1. Field of the Invention

The present invention pertains to a solids removal system for use in process separator vessels and the like comprising a unique arrangement of liquid jet nozzles for urging accumulating and settled solids toward drain openings in the vessel.

2. Background

In many process vessels, particularly where separation processes are carried out, accumulations of sand and other sediments occur along the bottom of the vessel interior. Solids removal from separator vessels utilized in the production of crude oil is a particularly vexatious problem, particularly in applications where the crude oil must be separated from produced water and wherein a liquid mixture of oil and water entering the vessel contains substantial amounts of solids in the form of sand and other sediments. The accumulation of sand and other solids in process vessels create certain operational problems including, restricting the flow of liquids within and out of the vessel, and, in certain operations such as the above mentioned crude oil production systems, solids accumulation can promote the growth of types of bacteria which corrode the vessel and produce substances which are difficult to separate from the process liquids.

Liquid jet type solids fluidization and removal systems known in the prior art suffer certain disadvantages in that the liquid jets are not oriented to promote efficient and thorough removal of the solids from the bottom of the vessel. Liquid jets emanating within a body of liquid dissipate rapidly and lack sufficient energy to effectively remove sediments in vessels wherein relatively heavy accumulations are likely to occur. It is to this end that the present invention has been developed with a view to providing an improved liquid jet type solids removal system for process vessels and, in particular, separator vessels for separating crude oil from produced water and other liquids wherein the liquid mixture entering the vessel includes a substantial amount of sand and similar entrained sediments.

SUMMARY OF THE INVENTION

The present invention provides an improved liquid jet solids removal system for process separator vessels for effectively removing accumulations of sand and other sediments which have settled along the bottom side of the vessel.

In accordance with one important aspect of the present invention, a liquid jet solids removal system is provided which includes a plurality of liquid jet nozzles spaced apart in the vicinity of the vessel area where solids accumulate and which nozzles are oriented to induce flow generally horizontally and in a direction toward drain openings in the vessel.

In accordance with another aspect of the invention, the nozzles are arranged along a manifold or conduit member in such a way that substantially horizontally extending vortical flow is created within a body of liquid in the vessel to fluidize the solids for removal from the vessel with fluid which has taken residence in the lower part of the vessel and without remixing the solids with fluid which has been separated and is disposed in an upper part of the vessel.

In one preferred embodiment of the invention there is provided an arrangement of liquid jet nozzles which are formed in a conduit extending longitudinally along the vessel bottom wall and spaced therefrom and wherein nozzles are arranged along both the top and bottom of the conduit and in a manner to provide a liquid jet having a substantially horizontal component directed toward spaced apart outlet openings in the vessel. The liquid jets provide for a substantially cyclonic or vortical flow pattern about the liquid supply manifold or conduit to further induce movement of the solids and to fluidize the accumulation of solids for removal from the vessel. The nozzle manifolds are preferably provided with flow shields which redirect the flow from the nozzle and assist in prevent mixing of the fluidized solids with the main body of separated liquid within the vessel itself.

Those skilled in the art of the present invention will further appreciate the advantages and features of the invention described hereinbefore together with other superior aspects thereof upon reading the detailed description which follows in conjunction with the drawing.

DESCRIPTION OF A PREFERRED EMBODIMENT

Figure 1:
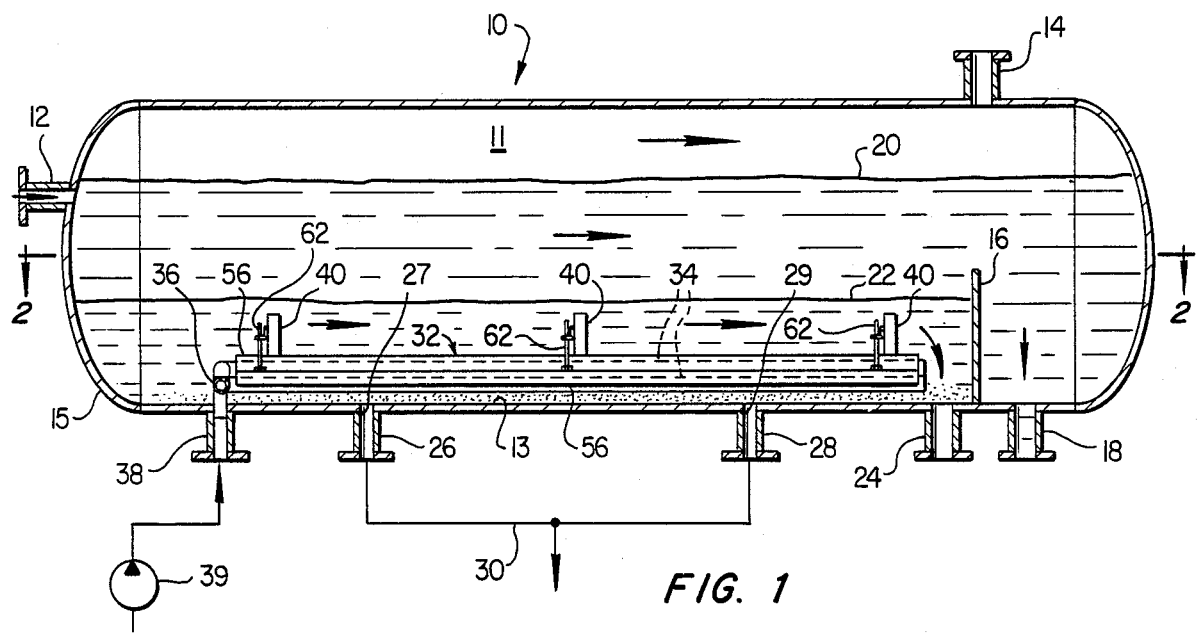
FIG. 1 is a longitudinal vertical central section view of a process separator vessel including the improved liquid jet solids removal system of the present invention.

In the description which follows, like parts are marked throughout the specification and drawing with the same reference numerals, respectively. The drawing figures are not necessarily to scale and certain features of the invention are shown in somewhat schematic form in the interest of clarity and conciseness.

Figure 2:
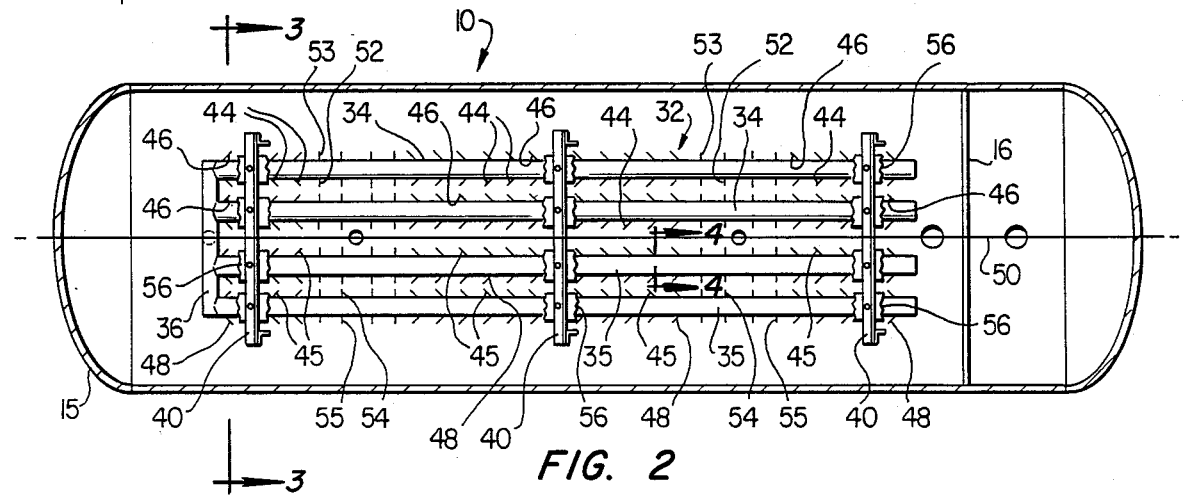
FIG. 2 is a section view taken along the line 2—2 of FIG. 1 showing the solids removal system in somewhat schematic form.
Figure 3:
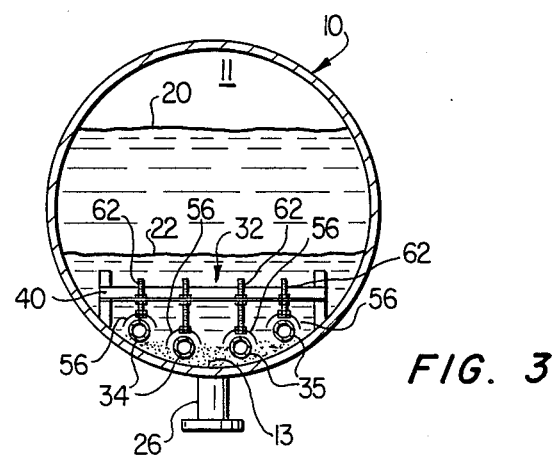
FIG. 3 is a section view taken along the line 3—3 of FIG. 2.

Referring primarily to FIGS. 1 and 2, the solids removal system of the present invention is shown in conjunction with a process separator vessel generally designated by the numeral 10. The vessel 10 is utilized to separate crude oil and gas from produced water in the production of oil from subterranean formations and, in particular, formations which are being waterflooded to stimulate oil production. The process vessel 10 includes a fluid inlet conduit 12, a gas outlet 14 and a weir 16 disposed transversely in the vessel adjacent the end of the vessel opposite the inlet conduit. The weir 16 is adapted to prevent water separated from the oil in the vessel interior 11 from passing out of the vessel 10 through an outlet conduit 18 which is primarily intended to remove the separated oil from the vessel.

During normal operation liquid is maintained in the vessel to a level indicated by numeral 20 and an oil-water interface is maintained generally along a line indicated by the numeral 22. Separated water or other liquid more dense than the oil is removed through an outlet conduit 24. In the production of crude oil where a significant amount of water is also produced solids entrained in the oil water mixture accumulate along the bottom wall 13 of the vessel 10 and are typically removed on a continuous or occasional basis by fluidizing or entraining the accumulated solids with water in the vessel for removal through spaced apart openings 26 and 28 which are connected to a suitable discharge conduit 30. Since the solids reside in the accumulated water within the vessel 10, typically, some of the solids-free produced water is utilized to remove the solids through the conduits 26 and 28.

In accordance with the present invention, an improved solids removal system is provided and generally designated by the numeral 32 in the drawing figures. The solids removal system for the vessel 10 is characterized by a plurality of longitudinally extending liquid jet manifold members or conduits 34 and 35 which are spaced apart from each other and extend over a substantial length of the vessel interior 11 between the weir 16 and the vessel end 15. The jet manifolds 34 and 35 are connected at one end to a liquid supply manifold 36 extending transversely within the vessel 10 and connected to a liquid supply inlet conduit 38, FIG. 1. The conduit 38 is connected to a source of liquid, such as water, by way of a pump 39. A plurality of spaced apart support members 40 are adapted to support the jet manifolds 34 and 35 within the vessel 10 and standing off in spaced relationship from the bottom wall 13.

Each of the manifolds 34 and 35 is provided with a plurality of spaced apart jet nozzles which are arranged along both the upper and lower sides of the manifolds themselves. In FIG. 2 the directional pattern and spacing of the liquid jet nozzles is indicated by the short directional lines. For example, the jet nozzles arranged along the bottom sides of each of the manifolds 34 and adjacent to the wall 13 are indicated by the numerals 44 and have a generally vessel longitudinal directional component of the jet emanating from the nozzles, respectively. The manifolds 35 have similar nozzles indicated by the numerals 45. In like manner, each of the manifolds 34 have a row of spaced apart jet nozzles 46 arranged along the top sides of the manifolds and which have a directional component as indicated by the short lines indicating the directions of the jets from nozzles 46. The manifolds 35 have a similar pattern of upper jet nozzles as indicated by the lines 48.

Respective fluidized solids outlet openings 27 and 29, associated with the conduits 26 and 28, are located in the vessel 10 in such a way that at least some of the jet nozzles formed in the manifolds 34 and 35 are directed generally transverse to the longitudinal central axis 50 of the vessel 10 and are indicated by the numerals 52, 53, 54 and 55, respectively. The nozzles which extend generally transversely from the manifolds 34 and 35 along the bottom sides of the manifolds are indicated by the numerals 52 and 54 and the nozzles which extend generally transversely along the top sides of the manifolds 34 and 35 are indicated by the numerals 53 and 55, respectively. Accordingly, the directional patterns of the nozzles 44, 45, 46 and 48 are such as to impart flow in a direction toward the fluidized solids outlet openings 27 and 29 and the nozzles 52, 53, 54 and 55 are also directionally oriented to impart flow toward the openings 27 and 29.

The fluid jetting action provided by the nozzles 44, 45, 46, 48, 52, 53, 54 and 55 is enhanced by the provision of arcuate or generally semi-circular flow control shields 56 which are disposed above each of the manifolds 34 and 35 in spaced relationship thereto and which act to minimize the agitation of the body of liquid in the vessel 10 so that re-entrainment of the solids with liquid in the vessel above the separation line 22, in particular, will not occur to any substantial degree. In FIG. 2 a major portion of each of the shields 56 has been broken away to illustrate the jet nozzle pattern. Still further, the shields 56 assist in imparting a substantial vortical or helical flow pattern around the respective manifolds 34 and 35 and also assist in imparting directional flow to the liquid jets emanating from the nozzles 46, 48, 53 and 55, in particular, since these nozzles are arranged along the upper or top sides of the respective manifolds 34 and 35.

Figure 4:
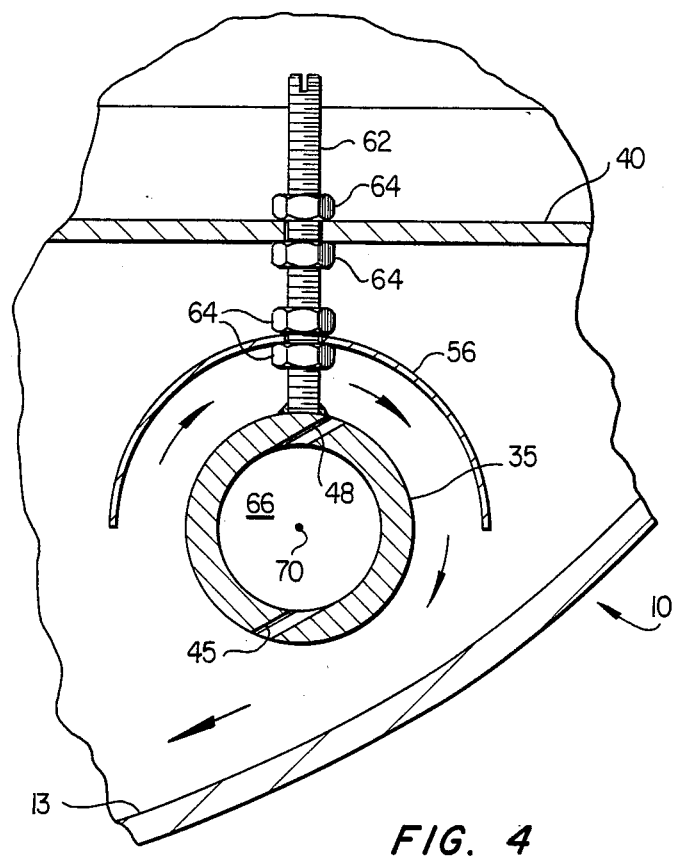
FIG. 4 is a detail section view of one of the liquid jet manifolds and its associated shield taken from the line 4—4 of FIG. 2.
Figure 5:
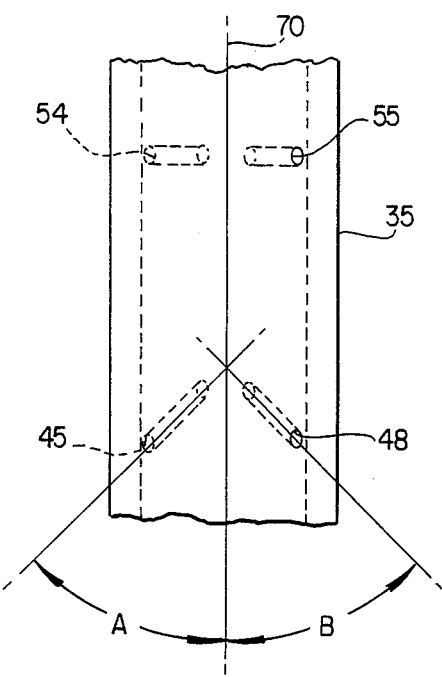
FIG. 5 is a plan view of a portion of one of the manifolds illustrating the orientation of the upper and lower jet nozzles.

Referring particularly to FIGS. 4 and 5, by way of example, the arrangement of the nozzles 45 and 48 on manifold 35 is illustrated in FIGS. 4 and 5 and the arrangement of nozzles 54 and 55 is shown in FIG. 5. The arrangement of the nozzles on the manifolds 34 are similar with the exceptions that the flow directions of the nozzles on the top and bottom of the respective manifolds 34 are opposite to those shown for the manifold 35 when viewed from the same direction. As shown also in FIG. 4, the manifold 35 is supported by the support member 40 by way of a threaded support rod 62 which is secured to the support member 40 by locknuts 64 so that the position of the manifold with respect to the bottom wall portion 13 of the vessel 10 may be selectively adjusted. In like manner, the shield 56 is also secured in a preselected position relative to the manifold 35 by a second set of locknuts 64. The manifolds 34 are supported in the same manner by similar sets of support rods 62 depending from each of the support members 40.

Each of the nozzles 45 and 48 as well as the nozzles 54 and 55 open into the interior passage 66 of the manifold 35 in a generally tangential direction to the passage wall. The nozzles 45 and 54 open into the vessel 10 substantially parallel to the wall 13, as shown by example in FIG. 4. Still further, the nozzles 45 and 48 are directed at angles with respect to the longitudinal axis 70 of the manifold 35, which axis is parallel to the axis 50, at angles A and B, which are each preferably approximately forty-five degrees so that a component of the fluid jet urges the solids mixture towards the openings 27 or 29, depending on the position of the respective nozzles 45 and 48 as well as the nozzles 44 and 46. The schematic of the nozzle directional pattern illustrated in FIG. 2 is preferable for the exemplary vessel 10. Of course, the nozzles 52, 53, 54 and 55 in the vicinity of the openings 27 and 29 extend in a substantially normal direction with respect to the axes 70 and 50. The nozzles 46, 48, 53 and 55 are, respectively, substantially opposite the nozzles 44, 45, 52 and 54.

By way of example, a liquid jet solids removal system generally in accordance with the system described herein and illustrated in the drawings was tested to determine the effectiveness of removing approximately 2000 pounds of 100 mesh sand from a process separator vessel in which an array of jet nozzle manifolds was installed having a length of approximately 18 feet each and each manifold comprising a two inch nominal diameter steel pipe connected to a suitable supply manifold and closed at its end opposite the supply manifold, respectively. An array of ⅜" diameter nozzles having the nozzle pattern illustrated in FIG. 2 and being arranged at angles of forty-five degrees to the longitudinal axis of the vessel was provided for each jet manifold. With the above mentioned charge of sand placed in the vessel substantial portions of the jet manifolds were initially buried under the sand. Water was pumped to the respective manifolds at a pressure of 50 psig and a flow rate of approximately 70 gallons per minute per jet manifold. Approximately 1600 pounds of the initial charge of sand was evacuated from the vessel in less than 20 minutes with a major portion of the sand being removed from the vessel in the first two minutes of the operation. All of the manifolds were uncovered from their previous buried condition. Throughout the test period there was no evidence of damage to the interior coating of the vessel wall and the jet trajectories essentially parallel to the vessel wall do not harm the coating even while jetting sand. For the test described above the shields 56 were formed of metal pipe having a shield radius of approximately 2 inches so that a standoff of the shield from the jet manifold of one inch was provided and the manifolds were spaced approximately one inch from the bottom wall of the vessel.

A preferred mode of operating the liquid jet solids removal system of the present invention is believed to be readily understandable from the foregoing description and the test data set forth in the example described above. The system may be constructed of conventional engineering materials and the source of liquid for evacuating the solids from the process vessel 10 may comprise treated water which is suitable for mixing with the water discharged through the conduit 30. The system 32 may also be advantageously used with a solids removal system of the type described in my copending patent application entitled: "Apparatus For Removing Solids From Process Separator Vessels", filed of even date herewith and assigned to the assignee of the present invention.

Although a preferred embodiment of the present invention has been described in detail herein, those skilled in the art will recognize that various substitutions and modifications may be made to the embodiment described in detail without departing from the scope and spirit of the invention as recited in the appended claims.

What I claim is:

1. In a process separator vessel wherein accumulations of relatively fine solids occur along a bottom wall surface of said vessel, and said vessel includes at least one outlet opening for discharging a fluidized mixture of said solids with a solids evacuation liquid, a system for removing said accumulated solids for discharge through said outlet opening comprising:
   at least one elongated jet manifold extending along said vessel and standing off from said wall surface in the vicinity of accumulated solids, said jet manifold including an array of jet nozzles spaced apart along said manifold including a plurality of jet nozzles opening from a bottom side of said manifold and adjacent to said wall surface and a plurality of jet nozzles opening from a top side of said manifold, the angular orientation of said nozzles with respect to said manifold being such as to create a substantially vortical flow of liquid around said manifold and in the vicinity of said wall surface, and at least a majority of said nozzles being oriented to emit liquid jets in a direction which includes a directional component extending toward said outlet opening for fluidizing and entraining accumulated solids in said vessel in said vortical flow of liquid and to move toward said outlet opening to prevent substantial accumulations of said solids along said wall surface.

2. The system set forth in claim 1 including:
a shield extending along and above said jet manifold for redirecting the flow of liquid from said nozzles.

3. The system set forth in claim 1 wherein:
at least some of said nozzles are oriented to discharge liquid into said vessel in a substantially horizontal direction.

4. The system set forth in claim 1 or 3 wherein:
at least some of said nozzles are oriented to discharge liquid at an angle of about forty-five degrees with respect to the longitudinal axis of said vessel.

5. The system set forth in claim 1 including:
support means for supporting said manifold to stand off from said wall surface.

6. The system set forth in claim 5 wherein:
said support means comprises a threaded member connected to said manifold and to a support bracket for adjusting the position of said manifold relative to said wall surface.

7. The system set forth in claim 6 including:
a shield supported by said support means and generally above said manifold for redirecting the flow of fluid from at least some of said jet nozzles.

8. In a process separator vessel for separating liquids such as oil from water and the like, said vessel including at least one outlet opening arranged along a bottom wall portion of said vessel for removing a fluidized mixture of accumulated solids and one of said separated liquids from said vessel, the improvement comprising:
   a liquid jet solids removal system characterized by a plurality of elongated tubular jet manifolds extending along said wall portion of said vessel in the vicinity of said vessel where solids accumulate during process separation operations, said jet manifolds each including a plurality of liquid jet nozzles arranged on said manifolds to provide liquid jets emanating from said nozzles along said wall portion and in a direction at least partially toward said outlet opening;
   an arcuate shield disposed above and spaced from each of said jet manifolds for redirecting the flow of liquid from at least some of said nozzles;
   said jet nozzles being arranged to cooperate with said shield to provide a substantially vortical flow of liquid around said manifolds, respectively, and toward said outlet opening, and
   means for supplying liquids to said jet manifolds to create a fluidized mixture of accumulated solids and liquid for evacuation from said vessel through said outlet opening.

* * * * *